United States Patent [19]

Harrell

[11] 4,148,150
[45] Apr. 10, 1979

[54] MOBILE INSECT COLLECTING AND DESTROYING APPARATUS

[76] Inventor: Robert C. Harrell, 616 N. St. John, Dyersburg, Tenn. 38024

[21] Appl. No.: 893,934

[22] Filed: Apr. 6, 1978

Related U.S. Application Data

[63] Continuation-in-part of Ser. No. 741,694, Nov. 15, 1976, Pat. No. 4,094,088.

[51] Int. Cl.² ............................................... A01M 1/20
[52] U.S. Cl. ..................................................... 43/144
[58] Field of Search ........................... 43/140, 143, 144

[56] References Cited

U.S. PATENT DOCUMENTS

| | | | |
|---|---|---|---|
| 1,492,858 | 5/1924 | Muse | 43/143 |
| 1,530,681 | 3/1925 | Long | 43/144 X |
| 1,580,297 | 4/1926 | Hammock | 43/144 |
| 2,740,228 | 4/1956 | Riggs | 43/144 |
| 3,477,174 | 11/1969 | Lalor | 43/144 X |

*Primary Examiner*—Nicholas P. Godici
*Assistant Examiner*—Robert P. Olszewski

[57] ABSTRACT

Tractor mountable apparatus for collecting and destroying insects from multiple rows of plants, such as cotton, as the tractor passes along the rows is disclosed. The apparatus comprises a supporting frame including longitudinal support members mountable upon the front end of a tractor to project forward rather than rearwardly thereof, and transverse support members carried by the longitudinal support members. A plurality of insect destroying open topped metal pans are suspended from the transverse support members and are spaced to pass between the rows of plants as the apparatus moves through a field. Each of the pans has an elongated perforated gas fired burner for heating the pan and for completely incinerating insects falling into the pans, and laterally extending resilient agitator means or flexible aprons mounted thereon for knocking insects from the side branches of the plants. A vertically adjustable transverse agitator rod extends across the entire width of the apparatus directly above the pans for engaging the tops of plants and for knocking insects therefrom into the pans. Each of the pans is mounted to swing rearwardly and upwardly when encountering a stone or other low lying ground object, and motor operated means is provided for simultaneously raising and lowering all of the pans at the will of an operator. In a modified embodiment of the invention, a vertically adjustable transverse canopy comprising a horizontally disposed top plate, opposite side walls, a downwardly inclined rear plate and an open front extending across the entire width of the apparatus directly above the pans is substituted for the vertically adjustable transverse agitator rod.

14 Claims, 9 Drawing Figures

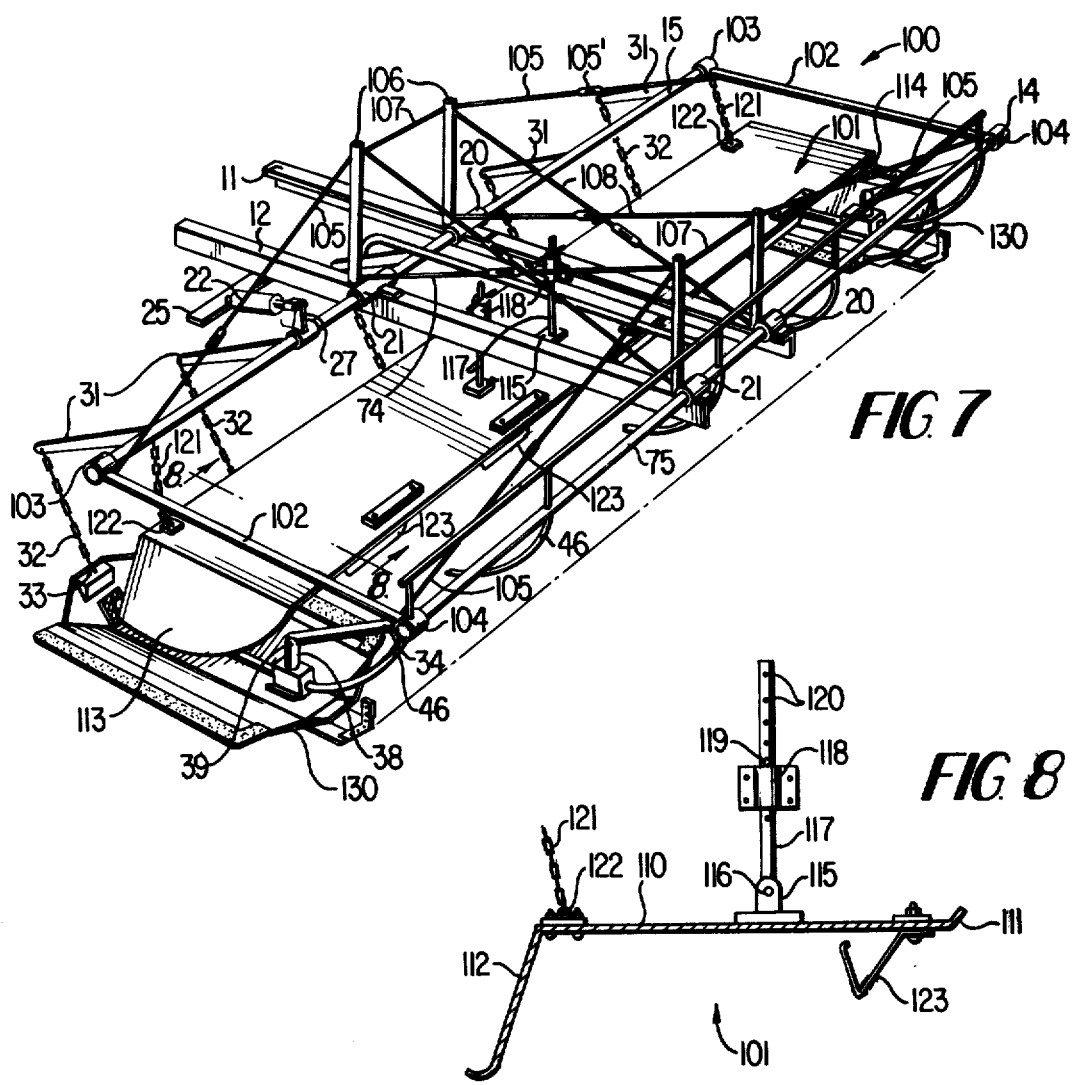
FIG. 7
FIG. 8
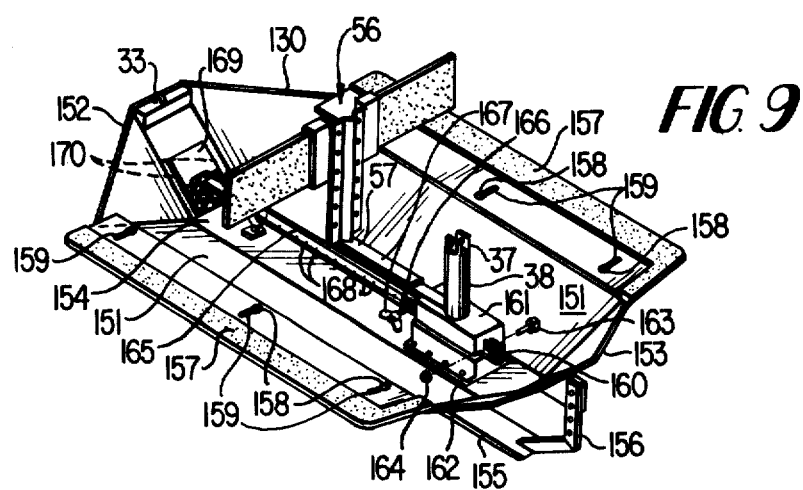
FIG. 9

MOBILE INSECT COLLECTING AND DESTROYING APPARATUS

CROSS REFERENCE TO RELATED APPLICATIONS

This invention is a continuation-in-part of my pending patent application Ser. No. 741,694 filed Nov. 15, 1976 now U.S. Pat. No. 4,094,088 for Mobile Insect Collecting and Destroying Apparatus.

BACKGROUND OF THE INVENTION

1. Field of Invention

This invention relates to mobile apparatus preferably carried on the frame of a tractor for movement through a field of row crops, such as cotton, to agitate the plants in the rows being transversed and to knock insects therefrom so that the insects fall into a plurality of open topped pans moving between the rows whereby the insects are completely incinerated and destroyed by the heat and flame from burners located in the open topped pans.

2. State of the Prior Art

Apparatus for removing insects from field row crops such as cotton, and for destroying the insects removed from the plants, have been previously proposed. Representative examples of the prior art proposals are found in the following patents:

| Pat. No. | Patentee | Issue Date |
| --- | --- | --- |
| 803,371 | Tanner | Oct. 31, 1905 |
| 1,415,491 | Souther | May 9, 1922 |
| 1,530,681 | Long | Mar. 24, 1925 |
| 1,580,297 | Hammock | Apr. 13, 1926 |
| 2,564,774 | Allen | Aug. 21, 1951 |
| 2,608,023 | Dillon | Aug. 26, 1952 |
| 2,617,229 | Huseby | Nov. 11, 1952 |
| 2,740,228 | Riggs | Apr. 3, 1956 |

Apparatus for flame cultivating row crops which includes burner apparatus mounted transversely to the front of a tractor is disclosed in U.S. Pat. No. 3,477,174 issued to William F. Lalor on Nov. 11, 1969.

SUMMARY OF THE INVENTION

This invention provides an improved means for removing and destroying insects from multiple rows of row crops in a single pass through a field. While the invention is particularly advantageous for use in removing and destroying boll weevils and larvae from cotton plants, it may also be used for removing and destroying other types of insects from cotton and from other types of row crops.

It is an object of this invention to provide an improved tractor mountable insect collecting and destroying apparatus for collecting insects from growing plants in multiple rows by agitating the plants so that the insects drop into pans carried by the apparatus beneath the agitating means, and for destroying the insects by burning in the open topped pans heated by elongated burners mounted longitudinally therein.

It is an object of this invention to provide insect removing and destroying apparatus which includes a supporting frame which is readily attachable to and detachable from the front end of a tractor, a plurality of transversely spaced, elongated metal pans suspended beneath the frame, flexible agitator means for each pan for agitating the sides of plants in the rows passed by the pans and for knocking bugs therefrom, an elongated gas burner in each pan for heating the pans and destroying insects falling therein, a vertically adjustable agitator rod mounted above the pans and extending the full width of the apparatus for knocking insects from the tops of the plants as the apparatus passes along the rows, yieldable mounting means for each pan enabling each pan to swing rearwardly and upwardly when encountering an unyielding object, and motor operated means for selectively raising and lowering all of the pans simultaneously.

In a modification of this invention, a vertically adjustable transverse canopy is substituted for the vertically adjustable transverse agitator rod. The canopy extends across the entire width of the apparatus directly above the pans and comprises a horizontally disposed top plate or cover, a downwardly inclined rear deflector plate, or drag, opposite side walls and an open front. Individual row agitator members may be mounted inside of the canopy. The canopy is adjusted to a height where the top plate brushes across the tops of the row plants and the downwardly inclined rear plate further agitates the plants and deflects the insects and larvae which are knocked or otherwise removed from the plants toward the open incinerator pans.

It is a further object of this invention to provide a modified incinerator pan which includes a burner manifold which may be removed to throw an open flame. Other features of the modified incinerator pan include flame orifices designed for greater fire power, a slide and front extension with adjustment for height for protecting the pan from damage, adjustable rubber side flanges, an adjustable gas/air ratio control for the burner, a removable sliding door and screen at the rear of the pan for aid in disposal of insects, improved lift supports, and improved agitator and agitator supports.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which:

FIG. 6 is a partial bottom plan view of one of the gas burner pipes included in the invention;

FIG. 7 is a perspective view of another embodiment of the invention;

FIG. 8 is a cross-sectional view of the canopy portion of the invention taken on line 8—8 of FIG. 7;

FIG. 9 is a perspective view showing a modified incinerator pan element of the invention.

DETAILED DESCRIPTION OF THE PREFERRED EMBODIMENTS

Figure 1:
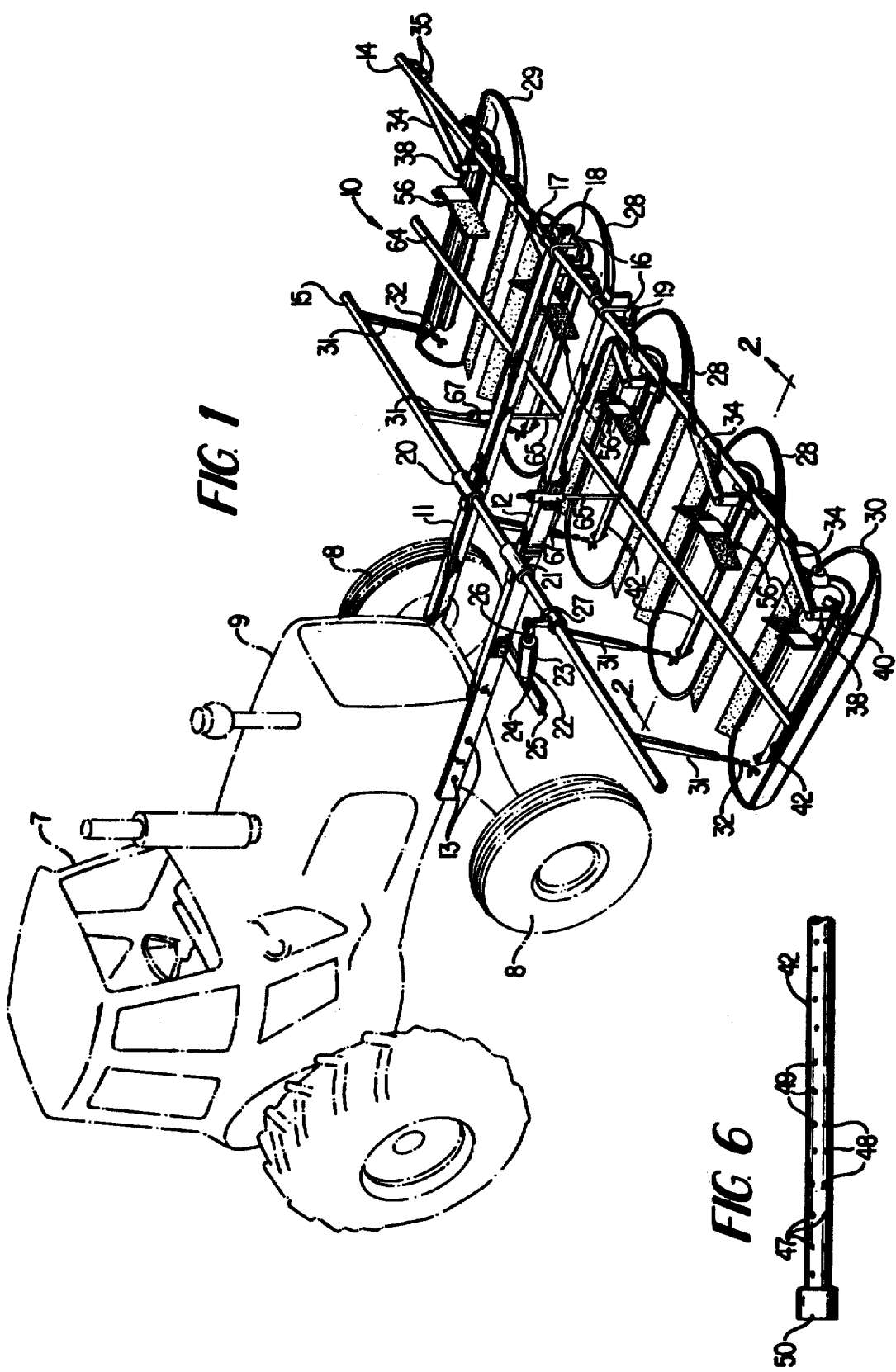
FIG. 1 is a perspective view showing the invention mounted on the front end of a row crop tractor which is shown in phantom.

Referring to the drawings and particularly to FIG. 1, one embodiment of the insect removing and destroying apparatus of this invention, generally indicated by the numeral 10, is illustrated as being detachably mounted forward of the front wheels 8 of a row crop tractor 9. The apparatus 10 includes a frame having a pair of parallel, transversely spaced longitudinal support members 11 and 12, and a pair of longitudinally spaced parallel transverse support members 14 and 15. The longitudinal support members 11 and 12 are preferably heavy gauge angle iron bars which extend rearwardly along opposite sides of the front end of the tractor and are bolted to the tractor by bolts 13. Major portions of the longitudinal support members 11 and 12 project forwardly of the tractor's front wheels 8 and have mounted thereon the parallel transverse support member 14 and 15, which are, for example, elongated pipes. The front transverse support member 14 is clamped on top of the longitudinal support members 11 and 12 by a pair of U-bolt clamps 16,16. Each of the clamps 16 comprises a pair of U-bolts 17,17 straddling the front transverse support member 14 on opposite sides of one of the longitudinal support members 11 and 12 and a clamping plate 18, positioned on the underside of the respective longitudinal support member, which is provided with apertures through which the downwardly extending legs of the U-bolts project. Nuts 19 are threaded on the ends of the U-bolts 17,17 beneath the clamping plate 18 and are tightened against the plate 18 to draw the U-bolts downwardly and thus to secure the front transverse support member 14 firmly against the top of the longitudinal support members 11 and 12.

The rear transverse support member 15 is rotatably mounted in journal bearings 20, 21 affixed on top of the longitudinal support members 11 and 12 respectively and is prevented from axial motion. The member 15 may be rotated through an appropriate arc by means of a double acting fluid piston and cylinder motor 22. The cylinder 23 of the motor 22 is pivotally attached by a clevis 24 to a bracket 25 laterally projecting from the longitudinal support member 12 to which it is secured by welding, or other appropriate means. The end of the piston rod 26 extending from the cylinder 23 is forked and pivotally connected to a lever arm 27 non-rotatably affixed to the transverse support bar 15. Hydraulic lines extend from the cylinder 23 to the cab 7 of the tractor 9 where suitable hydraulic controls (not shown) for operating the motor 22 are mounted.

Figure 2:
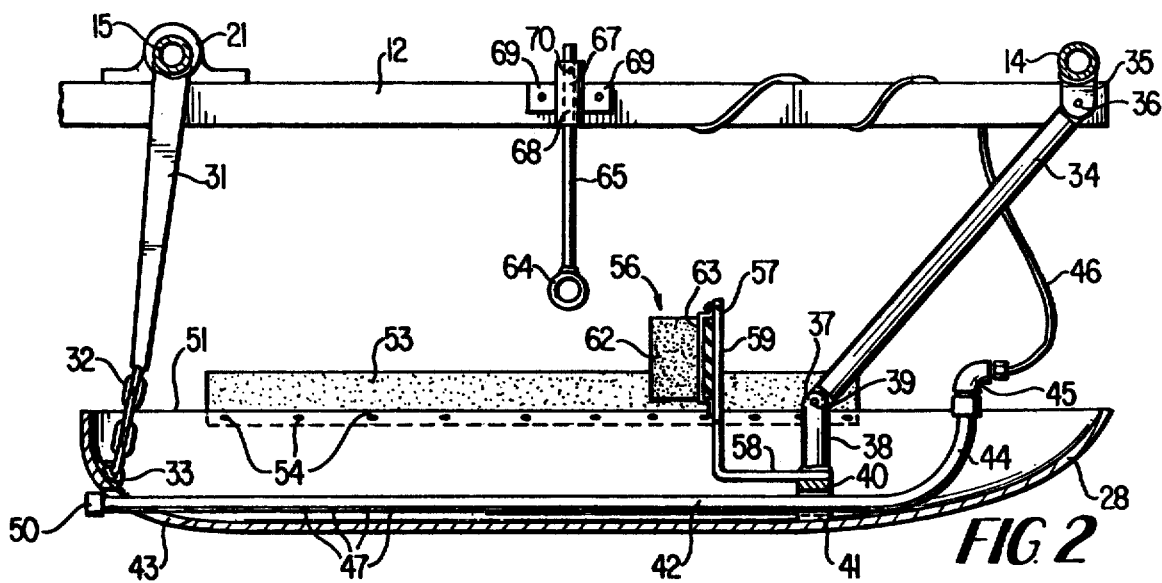
FIG. 2 is a vertical sectional view taken along line 2—2 in FIG. 1.
Figure 3:
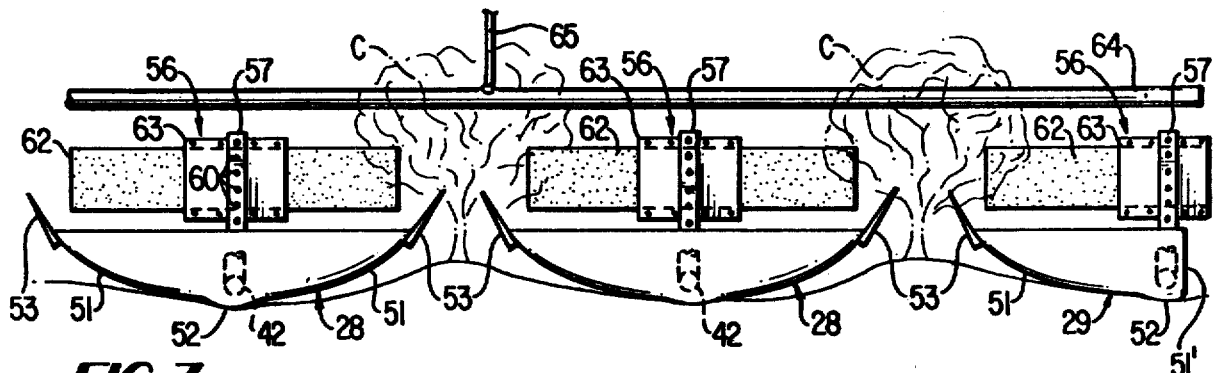
FIG. 3 is a partial front elevational view of the right hand portion of the invention shown in FIG. 1.

Suspended beneath the transverse support members 14 and 15 are a plurality of elongated intermediate insect destroying boat-shaped metal pans 28, and elongated right and left end pans 29 and 30. The end pans 29 and 30 and the three intermediate pans 28 are approximately equally spaced along the transverse support bars 14 and 15. Sufficient space is provided between adjacent pans to permit the passage of rows of cotton C, or other crops, between the pans as the tractor, with the insect removing and destroying apparatus of this invention attached, moves along the rows (FIG. 3). Each of the three intermediate pans 28 and each of the end pans 29 and 30 are supported at the rear by a bracket arm 31, affixed to and depending radially from the rear transverse support member 15, and by a chain 32 secured to the lower end of the bracket 31 by one end, and fastened to a ring 33 welded at the rear of the pan. The front end of each of the pans is pivotally supported from the front transverse support member 14 by a link 34 which is pivotally connected at its upper end between a pair of spaced parallel ears 35,35 affixed to and depending from the member 14 by a pivot pin 36 (FIG. 2). The lower end of each of the links 34 is pivotally connected between the upper forked end 37 of an upstanding bracket 38 by a pivot pin 39. The bracket 38 has an arched base 40 with opposite end flanges 41,41 that are shaped to conform to the inside surface of one of the respective pans and that are welded thereto.

The insect destroying metal pans 28,29 and 30 can be lifted to provide ground clearance sufficient for turning or road travel by actuating the hydraulic motor 22 to force the piston rod 26 outwardly thereby turning the crank arm 27 forwardly and the bracket arms 31 rearwardly. Rearward motion of the bracket arms 31 from the position shown in FIG. 1 pulls the pans 28,29 and 30 rearwardly and simultaneously lifts the pans above the ground. As the pans are pulled to the rear, the links 34 swing upwardly and lift the front ends of the pans so that the pans move rearwardly and upwardly in substantially parallel relationship to the ground. The pans are lowered by reversing the hydraulic motor 22 to retract the piston rod 26 and pull the crank arm 27 rearwardly thereby swinging the brackets 31 down.

The three intermediate metal pans 28 are substantially identical in structure because they are each designed to catch insects which are knocked from plants in rows on both sides of the pans along which the pans travel. The end pans 29 and 30 are of less width then the pans 28 because they are designed to catch bugs knocked from the outside branches of plants in only the outside rows along which the apparatus 10 moves. The apparatus 10, as shown in FIG. 1, is designed to remove and destroy insects from four crop rows at a time, thus it requires three intermediate pans 28 and the two end pans 29 and 30. By extending the length of the transverse support bars 14 and 15 equally on opposite sides of the longitudinal support bars 11 and 12, and by adding additional intermediate pans 28, the apparatus 10 can be made to service more than four crop rows at one time. The intermediate pans 28 are preferably about thirty-eight inches wide and about forty-five inches long while the end pans 29 and 30 are preferably about twenty-four inches wide and about forty-five inches long. Each of the pans 28, 29 and 30 includes an elongated perforated gas burner pipe 42 that runs the length of the pan and projects through an aperture 43 in the rear wall of the pan. The forward end 44 of the burner pipe 42 is curved upwardly and connected to a gas supply line 46 by suitable coupling means 45.

The bottom side of the burner pipe 42 includes multiple jet apertures 47 spaced lengthwise along the pipe in two longitudinal rows 48 and 49 as seen in FIG. 6. Each of the rows of jet apertures is offset circumferentially from a median longitudinal line at the bottom of the pipe so that burner gasses are directed downwardly and laterally on each side of the pipe. The gasses, when ignited, produce flames which impinge upon the bottom inner surface of the pan on opposite sides of the burner for heating the pan to a temperature sufficient to burn insects falling into the pan. The flame from the burner perforations or jets also directly contacts and incinerates the insects within the pans. The burner pipe 42 is closed at its rear end by a cap 50, or optionally by a plug (not shown) and is slightly elevated from the bottom of the pan to facilitate selfcleaning as it moves forward.

The forward end portion of the pipe 42 extends beneath the arched base 40 of the bracket 38 which locates the pipe 42 with respect to the bottom of the pan. The intermediate pans 28 have gently outwardly and upwardly curved sides 51,51 (FIG. 3) on opposite sides of a central bottom runner portion 52. The upwardly curved sides 51,51 funnel insects to the burner pipe 42 and heated area adjacent thereto. Flanges 53,53 of rubber, or other elastomeric material, and approximately three inches wide, are secured along the outboard edges of the sides 51,51 by rivets 54 so as to protect the plants C from abrasive damage. The two end pans 29 and 30 each have one gently outwardly and upwardly curved side 51 on the inside of a bottom runner portion 52 and a steep outer side 51'. The gently curved sides 51 of the end pans 29 and 30 have elastomeric flanges 53 secured along the outboard edges thereof. The steep sides 51' of the pans 29 and 30 are on the outside of the apparatus 10 and do not require a protective elastomeric flange 53 because the steep sides normally are located intermediately between a pair of adjacent rows of plants and do not contact the plants. Above each of the pans 28, 29 and 30 is a vertically adjustable resilient agitator generally indicated at 59 mounted upon an L-shaped bracket 57. The bracket 57 has a generally horizontal foot portion 58 and an integral upright portion 59. The end of the foot portion 58 is attached to the base 40 of the bracket 38 and extends rearwardly therefrom. The upright portion 59 has a plurality of longitudinally spaced apertures 60 through which bolts, screws or other suitable fasteners are selectively applied to secure the agitator 56 to the bracket. The agitators 56 each comprise a resilient strip 62, of rubber or other suitable elastomeric material extending laterally from the upright portion 59 of the bracket 57 and a clamp 63 transversely embracing the strip 62. The clamp 63 is secured at a selected height along the length of the upstanding bracket portion 59 by passing bolts or other fasteners through vertically spaced apertures in the clamp and through selected ones of the apertures 60 in the upstanding bracket portion 59. The resilient agitator strips 62 for each of the pans 28, 29 and 30 are of a length to extend transversely across substantially the full width of the pan. In the case of the intermediate pans 28, the strip 62 is fastened medially of its length to the bracket 57 so that equal portions of the strip extend laterally from the bracket 57 over the opposite sides of the pan 28. In the case of the end pans 29 and 30, the strip 62 is secured by one end to the bracket 57 so that the resilient agitator strip extends laterally from only one side of the bracket 57. The agitators 56 are not motor operated but they simply react to the force exerted by the plants C brushing against them as the apparatus 10 moves along the plant rows.

As an alternate form (not shown), the agitators 56 may comprise metal plates which are hinged adjacent to the upstanding portion 59 of the bracket 57 and which are spring loaded to extend laterally from the bracket 57 across one side of the pan. In the case of the intermediate pans 28, a pair of spring loaded, hinged metal plates would be provided to extend laterally across the pan 28 in opposite directions. In the case of the end pans 29 and 30, only one hinged plate would be required.

A rigid horizontal agitator rod 64 extends transversely above all of the pans 28, 29 and 30 for the full width of the apparatus 10. A pair of spaced vertical rods 65,65 which are rigidly connected to the agitator rod 64 as by welding, adjustably support the rod 64 from a pair of mounting brackets 67,67 fastened to the longitudinal support members 11 and 12 respectively. The mounting brackets 67 each comprise a vertically oriented open ended cylinder 68 (FIG. 2) for slidably receiving one of the vertical support rods 65. The cylinder 68 has laterally extending flanges 69,69 by which the bracket 67 is bolted or otherwise secured to one of the longitudinal support bars 11 and 12. The horizontal agitator rod 64 can be adjusted vertically to a selected height above the insect destroying pans 28, 29 and 30 and beneath the longitudinal support bars by sliding the vertical support rods 65 up or down within the mounting bracket cylinders 68 and by locking the rods within cylinders 68 at a selected position by tightening set screws 70 in the cylinders 68 which bear against the rod 65. The horizontal agitator rod 64 is adjusted to a suitable height for brushing against the tops of the plants C as shown in FIG. 3. The functions of the rigid horizontal agitator bar 64 and of the resilient agitators 56 are to brush against the tops and sides of the plants respectively, as the apparatus 10 moves along the crop rows, with sufficient force to knock insects from the plants. The insects knocked from the plants tend to fall toward the ground and are collected in the pans 28, 29 and 30 moving between the rows on top of the ground. The pans 28, 29 and 30 are of sufficient length so that when the insects are knocked from the plants by the agitators 56 and 64, most of the insects will fall within the pans and will be destroyed by the flames from the burner pipe 42 or by contact with the heated metal pans. The opening 43 at the rear end of the pans 28, 29, and 30 allows destroyed insects and other debris to pass out of the pan by the normal movement of the pan in operation.

Figure 4:
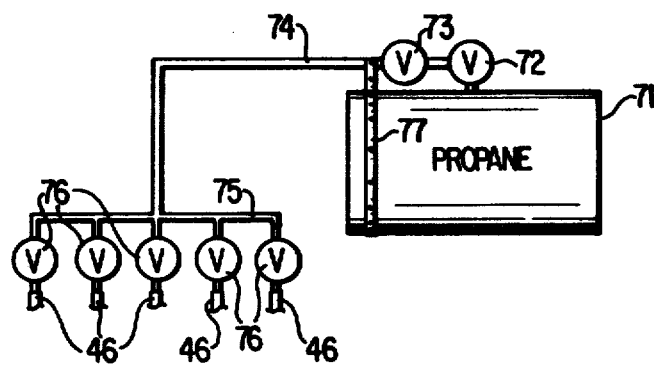
FIG. 4 is a diagramatic view of the gas supply and distribution system for a gas burner included in the invention.
Figure 5:
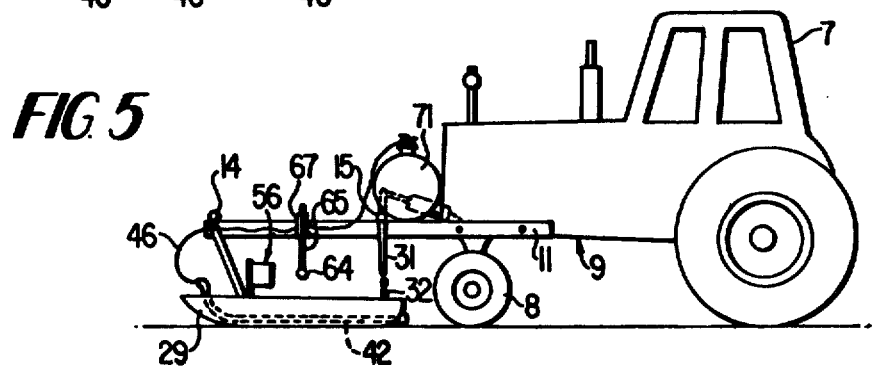
FIG. 5 is a side elevational view of the invention on a reduced scale.

The burner pipes 42 are supplied with a combustible gas, such as propane, from a gas tank 71 mounted on the longitudinal support members 11 and 12 in front of the tractor 9 as shown in FIG. 5. The system for the distribution of gas from the gas tank 71 is shown diagramatically in FIG. 4. It includes a main on-off valve 72 on top of the gas tank and a high pressure gas regulator valve 73, adjustable between about 45 and 100 PSIG, serially connected in a conduit 74 going from the tank 71 to a gas distributor manifold 75. Branching off from the manifold 75 are five individual lines feeding the gas burner pipes 42 in the two end pans 29 and 30 and in the three intermediate pans 28. Five individual gas control valves 76 are provided adjacent the manifold 75 for separate control of the five individual gas lines 46. The lines 46 leading from the individual gas control valves 76 are preferably flexible hoses. The conduit 74 leading to the manifold 75 is a rigid pipe which is supported by a bracket 77 strapped to the tank 71.

In use the main gas valve 72 is turned on and the regulator valve 73 is adjusted to the desired gas pressure for distribution to the gas burners 42. In normal use all of the individual regulator valves 76 are turned on to supply gas to the burner pipes in each of the pans 28, 29 and 30. The gas jets from the burner pipes 42 are preferably ignited manually, but an automatic ignition (not shown) may be optionally provided in each pan if desired. Once the burners 42 are ignited the apparatus 10 is ready for travel and the tractor begins its movement through a field of row crops such as cotton, parallel to the rows so that the pans 28, 29 and 30 are spaced between the rows. The pans are lowered by operating the hydraulic motor 22 in a manner already described so that the pans slide on top of the ground or just above the ground. If any of the pans encounters an obstruction, such as a stone or other object close to the ground, the pan automatically swings rearwardly and upwardly because of its flexible support from the front transverse support rod 14 by hinged links 34 and from the rigid bracket arm 31 by chain 32. The motion of the apparatus 10 through the field causes the rigid agitator bar 64 and the agitators 56 to brush the plants in the rows with sufficient impact to knock insects from the plants. The insects falling into the pans 28, 29 and 30 are burned and the debris exits from the pans through the rear opening 43. At the end of the row, the operator may lift the pans by means of the hydraulic motor 22 while turning and positioning the apparatus for another pass through the field.

Another embodiment of the invention is shown in FIGS. 7-9. The insect collecting and destroying apparatus 100 as seen in FIG. 7 is like the apparatus 10 shown in FIG. 1 except that a transverse canopy 101 which extends across the entire width of the apparatus has been substituted for the vertically adjustable agitator rod 64 of the apparatus shown in FIG. 1 and certain other modifications have been made as will be described.

Parts of the apparatus 100 which correspond with like parts of the apparatus 10 will be referred to by the same reference numerals. The apparatus 100 comprises a supporting frame including a pair of transversely spaced longitudinal support members 11 and 12 and a pair of elongated front and rear longitudinally spaced transverse support members 14 and 15 carried by the longitudinal support members 11 and 12 in separate pairs of journal bearings 20,21. The journal bearings 20 and 21 of each pair are affixed to the tops of the longitudinal support members 11 and 12 respectively by any suitable means such as welds, or separable fasteners. Separate rigid end braces 102 each having sleeves 103 and 104 at opposite ends thereof span the transverse support members 14 and 15 at their opposite ends. The ends of the front support member 14 fit inside of the sleeves 104 and are held thereby, while the ends of the rear support member 15, fit inside of the sleeves 103 and are rotatably supported therein. The end braces 102 are supported from vertically extending posts 106, of which there are four welded or otherwise rigidly attached to the tops of the support members 11 and 12, by means of tension members 105 each having a turnbuckle 105' attached intermediate the ends thereof. Tension members 107 connected between pairs of laterally spaced posts 106 on the members 11 and 12 prevent lateral spreading of the posts. The tension members 105 and end braces 102 support the ends of the transverse support members 14 and 15 against excessive bending under the weight of the various components which they support, principally the incinerator pans 130. Longitudinal braces 108 may be provided between the longitudinally spaced posts 106 on the same longitudinal support member 11 or 12 as required to prevent fore and aft bending of the posts. The support member 15 may be rotated through an appropriate arc by means of a double acting fluid piston and cylinder motor 22 as described with respect to apparatus 10.

Suspended beneath the transverse support members 14 and 15 are a plurality of elongated, transversely spaced incinerator pans 130 which generally correspond with the pans 28 and 30 of the apparatus 10, but which differ in some details. While only the end pans 130 are shown in FIG. 7, it will be understood that the apparatus includes a plurality of equally spaced pans 130 intermediate the end pans 130 in the manner of the apparatus 10 shown in FIG. 1. Each of the pans 130 is supported at its rear by a bracket arm 31 affixed to and extending radially from the rear transverse support member 15 and by a chain 32 secured to the free end of the bracket arm 31 by one end and fastened to a ring 33 welded at the rear of the pan. The front end of each pan 130 is pivotally supported from the front transverse support member 14 by a link 34 which is pivotally connected to the member 14 in the manner shown in FIG. 2. The lower end of each link 34 is pivotally connected between the upper forked end (FIG. 9) of the upstanding bracket arm 38 by a pivot pin 39.

The canopy 101 as seen in transverse cross section in FIG. 8 includes a top cover member 110 having an upturned leading edge 111, a depending rear plate or drag 112 integrally formed on the rear edge of the top plate, opposite depending side walls 113 and 114. The bottom and front side of the canopy 101 are open. Vertically adjustable support means for mounting the canopy at selected heights above the incinerator pans 130 so that the canopy brushes across the tops of plants in the rows of plants transversed by the apparatus includes a pair of pivot yokes 115 affixed to the top of the cover plate 110 along a line forward of and parallel to a longitudinal center line through the cover plate 110. Each of the pivot yokes 115 has a pivot pin 116 extending through the yoke and axially aligned with the pivot pin of the other yoke of said pair. A pair of vertically oriented support rods 117,117 are pivotally attached at their lower ends to the yokes 115 by the pivot pins 116. The support rods 117 are each slidably received in one of a pair of vertically oriented sleeves 118,118 affixed to the support members 11 and 12, and each rod may be vertically adjusted relative to one of the sleeves 118 by means of a locating pin 119 inserted in a selected one of a plurality of holes 120 spaced along the length of the rod 117. The locating pin 119 in each rod 117 extends laterally from the rod sufficiently so that it will rest on top of one of the sleeves 118 and be supported there on against the downward pull upon the rod 117 resulting from the weight of the canopy 101. The canopy is supported along its rear edge by suspension chains 121 each connected between the rear support member 15 and a ring 122 affixed to the top of the cover plate 110 adjacent its rear edge. Two suspension chains 121 located adjacent opposite ends of the canopy are shown in FIG. 7. One or more intermediate suspension chains may be provided to adequately support the canopy 101.

The function of the canopy 101 is to brush against the tops of the plants in the rows which the apparatus 100 transverses and to deflect insects which are shaken from the plants downwardly into the open top incinerator pans 130. The support rods 117 are preferably adjusted so that the top plate 110 is approximately level with the tops of the plants of average height in the rows being transversed. The canopy is pivotally supported so that the rear plate 112 may swing upwardly (clockwise as seen in FIG. 8) if it encounters an unyielding obstruction. To further increase agitation of the plants, a plurality of reversely bent agitator plates 123 are mounted inside of the canopy adjacent its front edge and depending therefrom. There is one agitator plate 123 spaced between each pair of adjacent incinerator pans so as to contact the top portion of the plants passing between adjacent pans 130 as the apparatus moves along the rows of plants.

The incinerator pans 130 are elongated boat-shaped open top metal pans having outwardly sloping opposite sides 151,151, a rearwardly sloping transom 152, a forwardly sloping bow 153 and a flat bottom 154. A slide 155 provided along the outer bottom surface of the pan, and its forward extension with adjustable support 156 prevents structural damage to the pan bottom. Elastomeric flanges 157,157 are adjustably mounted along the upper edges of the sides 151,151 by means of headed screws 158 extending through parallel slots 159 in the rubber flanges and screwed into threaded holes (not shown) in the sides 151. The flanges may be extended out or retracted a distance corresponding to the length of the slots 159 by loosening the headed screws 158.

Inside of each incinerator pan 130 and parallel with the bottom 154 a burner manifold 160 is clamped between a two-piece mounting block 161. The front end of the burner manifold projects forward of the mounting block 161, and is provided with an air intake hole which may be uncovered, partly covered, or completely covered by an adjustable clamping band 162 which is tightened by a bolt 163 and nut 164 to provide an air/gas ratio control. A manifold extension 165 extends rearwardly from the burner manifold 160 to apporximate the transom 152. The forward end of the manifold extension 165 telescopes in the rear end of the manifold 160 and is locked therein by a screw 166 and nut 167. The manifold extension 165 has plural burner orifices 168 spaced along its length. Removal of the manifold extension 165 provides an open flame spreading rearwardly from the burner manifold 160 along the bottom of the pan 130. The manifold extension with its spaced holes 168 provides for even distribution of the flame along the bottom of the pan and to each side.

Fuel is supplies to the individual pans 130 from a supply tank 71 (FIG. 4) through conduit 74, distributor conduit 75 and individual pipe lines 46. The tank 71 (not shown in FIG. 7) may be strapped to the supports 11 and 12 in front of the tractor.

An aperture is provided in the transom of each pan which is covered with a removable closure door and screen 169 slidably mounted in tracks 170 secured on the back side of the transom. The removable door facilitates disposal or permissible escape of insects depending upon the placement of the door.

Each pan 130 includes a vertically adjustable resilient agitator generally indicated at 56 which is supported by an L-shaped bracket 57 upon the mounting block 161. Since the structure and function of the agitator 56 is the same as that described for the like numbered element in the apparatus 10 no further description thereof will be made.

The apparatus 100 is mounted on the front of a tractor or other self propelled vehicle in the same manner as the apparatus 10 and the use and function of the two apparatus is basically the same. The canopy of the apparatus 100 facilitates a greater collection and destruction of insects knocked from the plants because it prevents the insects from flying upwardly and deflects the insects downwardly into the open burner pans 130.

While the apparatus has been described and claimed as being mountable upon the front end of a tractor, the term tractor is used in a broad sense and it should be understood to include any self-propelled vehicle or the like adapted for use in traversing row crops.

While in the foregoing there has been described and shown preferred embodiments of the invention, various modifications and equivalents may be resorted to within the spirit and scope of the invention as claimed.

What is claimed is:

1. Tractor mountable apparatus for collecting and destroying insects from multiple rows of growing plants comprising a supporting frame including longitudinal support means mountable upon the front end of a tractor to project forward thereof, and a pair of elongated front and rear longitudinally spaced transverse support members carried by the longitudinal support means, a plurality of elongated open top incinerator pans, suspension means for suspending said incinerator pans from said pair of transverse support members at transversely spaced intervals so that said pans move adjacent the ground between the rows of plants as the apparatus moves along the plant rows, burner means in each of said metal pans for heating said pans and for burning insects falling into said pans, each of said pans having also separate vine agitator means mounted above and transversely across the pan for agitating the side branches of adjacent plants along which the pan moves, and for knocking insects into the pan, said suspension means including yieldable independent suspension means for each of said pans permitting each of said pans to swing rearwardly and upwardly when encountering a stone or other low lying ground object, means for selectively raising and lowering all of said pans simultaneously, an elongated transverse canopy means for collecting insects and deflecting them downwardly into said pans, said canopy means extending across the entire width of said apparatus, and vertically adjustable canopy support means for mounting said canopy at selected heights above said pans so that said canopy brushes across the tops of the plants in the rows of plants transversed by said apparatus, said canopy having a top cover member, a downwardly extending rear deflector member, and an open front.

2. The apparatus of claim 1 wherein said vertically adjustable canopy support means includes pivot means permitting said canopy to pivot about a transverse axis parallel with said canopy so that said rear plate will swing upwardly when it encounters an obstruction in front thereof.

3. The apparatus of claim 1 wherein said vertically adjustable canopy support means includes a pair of transversely spaced vertically oriented sleeves carried by said longitudinal support means, vertical support rod slidable in each of said sleeves and extending downwardly therefrom pivot means at the lower ends of each of said support rods for pivoting said canopy to swing about a transverse axis parallel to said canopy, means for adjustably supporting said vertical support rods at selected heights with respect to said sleeves, and flexible suspension means connected between said rear transverse support member and the canopy adjacent said rear deflector plate for limiting downward swinging of said rear deflector.

4. The apparatus of claim 1 wherein said canopy also includes downwardly depending side walls on opposite ends thereof.

5. The apparatus of claim 1 wherein said supporting frame further includes a pair of parallel end braces at opposite ends of said front and rear longitudinally spaced transverse support members, each end brace of said pair having means at one end rotatably connecting it to an end of said rear transverse support member and means at its other end for connecting it to a corresponding end of said front transverse support member.

6. The apparatus of claim 5 wherein said supporting frame further includes upright posts rigidly supported on said longitudinal support means and tension means connected from said posts to said end braces for supporting the ends of said front and rear transverse support members against downward deflection.

7. The apparatus of claim 1 wherein each of said incinerator pans includes a slide extending longitudinally along the bottom surface thereof and projecting forwardly thereof for protecting the pan from damage from encounter with the ground and obstructions.

8. The apparatus of claim 1 wherein said incinerator pans include a front portion and a rear portion, and wherein said burner means includes an elongated burner manifold mounted longitudinally in the front portion of said pan, and a manifold extension having one end removably connected with said burner manifold, said manifold extension extending longitudinally along the rear portion of said pan and having a plurality of burner orifices spaced along the length thereof.

9. The apparatus of claim 8 wherein said burner manifold has an air/fuel ratio control means located therein.

10. The apparatus of claim 1 wherein said incinerator pan includes upwardly and outwardly sloping opposite sides, at least one of said sides having an adjustable extension flange with means for adjusting said extension flange inwardly and outwardly with respect to said side.

11. The apparatus of claim 10 wherein said extension flange is made of elastomeric material.

12. The apparatus of claim 10 wherein each of said incinerator pans further includes a forwardly and upwardly sloping bow and a rearwardly and upwardly sloping transom, said transom having an aperture therein, and a door slidably mounted thereon for opening and closing said aperture.

13. Apparatus for collecting and destroying insects from multiple rows of growing plants including an elongated supporting frame having means for mounting said frame on a tractor transversely in front thereof and above the ground, a plurality of elongated open top insect incinerator pans, suspension means for suspending said incinerator pans from said supporting frame at transversely spaced intervals so that said pans move adjacent the ground between the rows of plants as the apparatus moves along the plant rows, burner means in each of said pans for heating said pans and for burning insects falling into said pans, an elongated transverse canopy means for collecting insects and deflecting them downwardly into said pans, said canopy means extending continuously across all of said pans, and vertically adjustable canopy support means for suspending said canopy means from said supporting frame at selected heights above said pans so that said canopy means brushes across the tops of the plants in the rows of plants transversed by said apparatus, said canopy having a top cover member, a downwardly extending rear deflecting member and having an open front and open bottom.

14. The apparatus according to claim 13 wherein said canopy means further includes a plurality of individual row agitator means mounted within said canopy means adjacent the open front thereof for agitating the plants in each of the rows transversed by said apparatus.

* * * * *